(12) United States Patent
Al-Rubaii et al.

(10) Patent No.: US 11,428,099 B2
(45) Date of Patent: *Aug. 30, 2022

(54) AUTOMATED REAL-TIME DRILLING FLUID DENSITY

(71) Applicant: Saudi Arabian Oil Company, Dhahran (SA)

(72) Inventors: Mohammed Murif Al-Rubaii, Dammam (SA); Abdullah Saleh Hussain Al-Yami, Dhahran (SA); Salem H. Al Gharbi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 613 days.

This patent is subject to a terminal disclaimer.

(21) Appl. No.: 16/413,280

(22) Filed: May 15, 2019

(65) Prior Publication Data
US 2020/0362694 A1    Nov. 19, 2020

(51) Int. Cl.
*E21B 49/00*    (2006.01)
*E21B 21/08*    (2006.01)
*E21B 47/06*    (2012.01)
*G06F 17/11*    (2006.01)

(52) U.S. Cl.
CPC ............ *E21B 49/005* (2013.01); *E21B 21/08* (2013.01); *E21B 47/06* (2013.01); *E21B 49/003* (2013.01); *G06F 17/11* (2013.01)

(58) Field of Classification Search
CPC ........ E21B 21/08; E21B 47/06; E21B 49/003; E21B 49/005
See application file for complete search history.

(56) References Cited

U.S. PATENT DOCUMENTS

| | | | |
|---|---|---|---|
| 1,428,647 A | * | 9/1922 | Messenger ................ F01P 7/10 165/98 |
| 10,590,761 B1 | | 3/2020 | Martinez et al. |
| 10,781,681 B2 | | 9/2020 | Santos et al. |
| 10,989,046 B2 | | 4/2021 | Al-Rubaii et al. |
| 2011/0153296 A1 | | 6/2011 | Sadlier et al. |

(Continued)

FOREIGN PATENT DOCUMENTS

CA    3023860    12/2017

OTHER PUBLICATIONS

Abdelgawad et al., "New approach to evaluate the equivalent circulating density (ECD) using artifical intelligence techniques," Journal of Petroleum Exploration and Production Technology, Oct. 23, 2018, 10 pages.

(Continued)

*Primary Examiner* — John Fitzgerald
(74) *Attorney, Agent, or Firm* — Fish & Richardson P.C.

(57) ABSTRACT

Methods, systems, and computer-readable medium to perform operations including: determining, in real-time, values of drilling parameters of a drilling system drilling a wellbore; calculating, based on the values of the drilling parameters, a cuttings concentration in an annulus of the wellbore (CCA); calculating, based on the calculated CCA and a mud weight (MW) of a drilling fluid, an effective mud weight ($MW_{eff}$) of the drilling fluid; and controlling, based on the effective mud weight, a component of the drilling system to adjust at least one of the drilling parameters.

14 Claims, 6 Drawing Sheets

(56) References Cited

U.S. PATENT DOCUMENTS

| | | |
|---|---|---|
| 2013/0054146 A1 | 2/2013 | Rasmus |
| 2015/0176402 A1 | 6/2015 | Prakash et al. |
| 2016/0245048 A1 | 8/2016 | Jamison et al. |
| 2016/0369627 A1 | 12/2016 | Kulkarni et al. |
| 2017/0044896 A1 | 2/2017 | Salminen |
| 2018/0119537 A1 | 5/2018 | Viens et al. |
| 2019/0055797 A1 | 2/2019 | Astrid et al. |
| 2019/0316457 A1 | 10/2019 | Al-Rubaii et al. |
| 2019/0376385 A1 | 12/2019 | Martinez et al. |
| 2020/0371495 A1 | 11/2020 | Al-Rubaii et al. |

OTHER PUBLICATIONS

Ahmed et al., "The effect of drillstring rotation on equivalent circulation density: modeling and analysis of field measurements," SPE 135587, SPE Annual Technical Conference and Exhibition, Society of Petroleum Engineers, Sep. 19-22, 2010, 11 pages.

Baranthol et al., "Determination of hydrostatic pressure and dynamic ECD by computer models and field measurements on the directional HPHT well 22130C-13," SPE/IADC 29430, SPE/IADC Drilling Conference, Society of Petroleum Engineers, Feb. 28-Mar. 2, 1995, 10 pages.

Elzenary et al., "New technology to evaluatie equivalent circulating density while drilling using artificial intelligence," SPE 192282-MS, SPE Kingdom of Saudi Arabia Annual Technical Symposium and Exhibition, Society of Petroleum Engineers, Apr. 23-26, 2018, 14 pages.

Feng, "The Temperature of Prediction in Deepwater Drilling of Vertical Well," dissertation submitted to the Office of Graduate Studies of Texas A&M University in partial fulfillment of the requirements of the degree of Doctor of Philosophy, May 2011, 146 pages.

Guria, "Rheological analysis of drilling fluid using Marsh Funnel," Department of Petroleum Engineering, Indian School of Mines, 2013, 8 pages.

Harris et al., "Evaluation of equivalent circulating density of drilling fluids under high pressure/high temperature conditions," SPE 97018, SPE Annual Technical Conference and Exhibition, Society of Petroleum Engineers, Oct. 9-12, 2005, 10 pages.

Marsh, "Properties and Treatment of Rotary Mud," Society of Petroleum Engineers, Transactions of the AIME vol. 92, No. 1, 1931, 16 pages.

Osman and Aggour, "Determination of drilling mud density change with pressure and temperature made simple and accurate by ANN," SPE 81422, SPE, Society of Petroleum Engineers, Bahrain, Jun. 9-12, 2003, 12 pages.

Anonymous, drillingformulas.com [online], "Increase in mud weight due to cutting—drilling formulas and drilling calculations," available on or before Mar. 7, 2014, Jul. 28, 2020, retrieved from URL <http://www.drillingforumulas.com/increase-in-mud-weight-and-ecd-due-to-cutting/>, 8 pages.

Anonymous, drillingformulas.com [online], "Maximum ROP before fracture formation—drilling formulas and drilling calculations," available on or before Mar. 11, 2014, retrieved on Jul. 28, 2020, retrieved from URL <http://www.drillingforumulas.com/maximum-rop-before-fracture-formation/>, 7 pages.

Rubaii et al., "A new robust approach for hole cleaning to improve rate of penetration," presented at the SPE Kingdom of Saudi Arabia Annual Technical Symposium and Exhibition, Apr. 23-26, 2018, Dammam, Saudi Arabia, 40 pages.

PCT International Search Report and Written Opinion in International Appln. No. PCT/US2020/032675, dated Jul. 28, 2020, 15 pages.

PCT International Search Report and Written Opinion in International Appln. No. PCT/US2020/032644, dated Aug. 7, 2020, 15 pages.

* cited by examiner

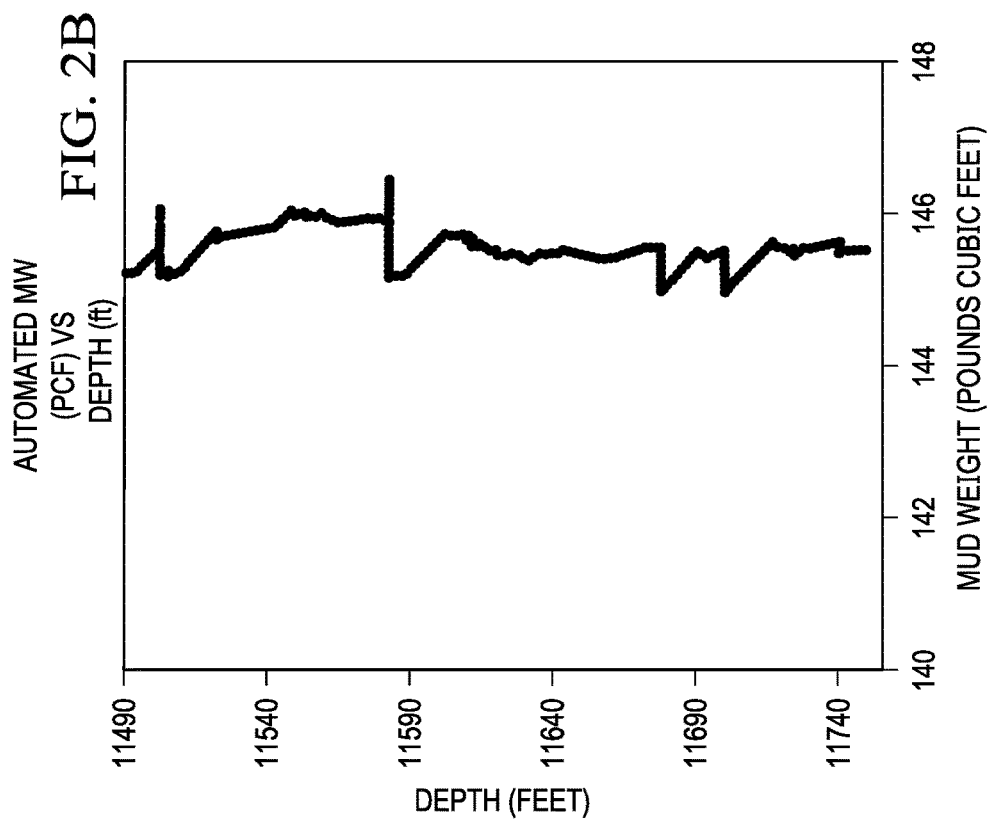
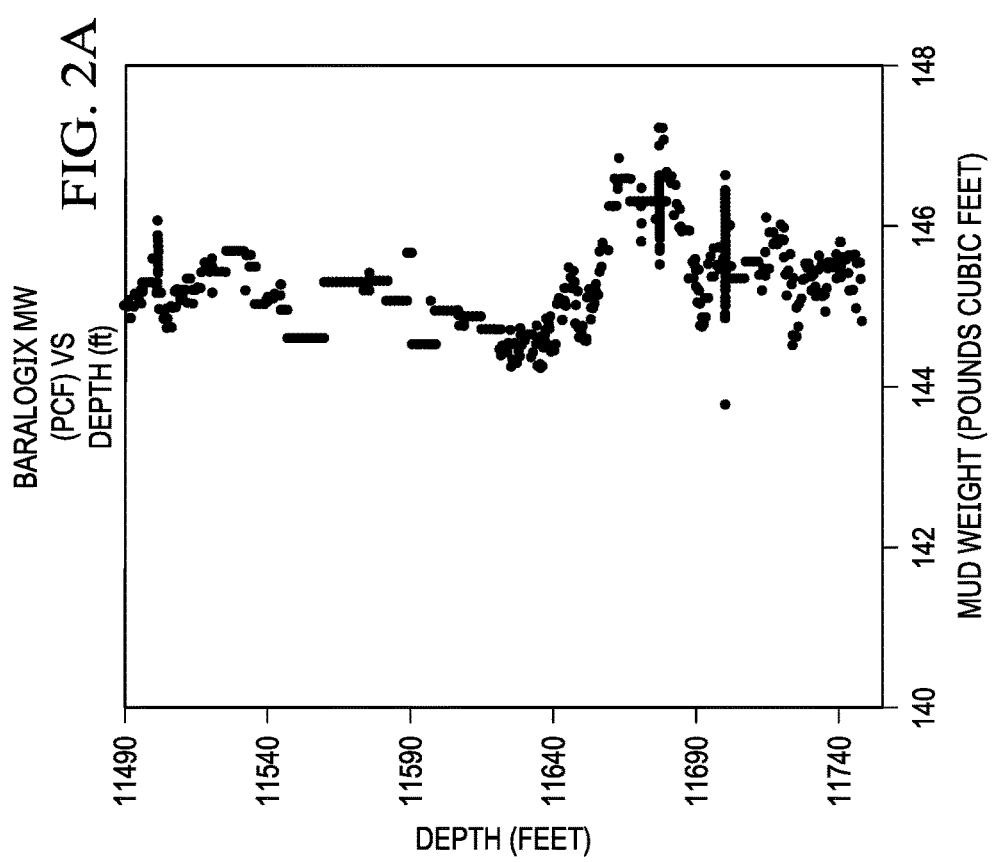

AUTOMATED REAL-TIME DRILLING FLUID DENSITY

The present disclosure relates to oil field exploration and, in particular, to methods and systems for calculating drilling fluid density.

BACKGROUND

In wellbore drilling, a drilling system causes a drill bit to rotate when in contact with a formation. The rotation of the drill bit breaks and fractures the formation to form the wellbore. When drilling the wellbore, the drilling system circulates a drilling fluid (also referred to as drilling mud or mud) to the drill bit where the drilling fluid exits through drill bit nozzles to the bottom of the wellbore. The drilling fluid serves many purposes including, but not limited to, cooling the drill bit, supplying hydrostatic pressure upon the formation to prevent fluids from flowing into the wellbore, and carrying formation cuttings from the wellbore to the surface.

SUMMARY

The present disclosure describes methods and systems for calculating a drilling fluid density and using the calculation to improve drilling operations. The methods and systems utilize real-time input parameters to calculate the drilling fluid density. In an embodiment, the drilling fluid density is calculated based on a cuttings concentration in the annulus (CCA), which is calculated from real-time values of drilling parameters. This drilling fluid density accounts for real-time cuttings weight and drilling fluid weight. This calculation of drilling fluid density is then used to adjust drilling parameters to improve drilling operations.

Aspects of the subject matter described in this specification may be embodied in methods that include the actions of: determining, in real-time, values of drilling parameters of a drilling system drilling a wellbore; calculating, based on the values of the drilling parameters, a cuttings concentration in an annulus of the wellbore (CCA); calculating, based on the calculated CCA and a mud weight (MW) of a drilling fluid, an effective mud weight ($MW_{eff}$) of the drilling fluid; and controlling, based on the effective mud weight, a component of the drilling system to adjust at least one of the drilling parameters.

The previously-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium. These and other embodiments may each optionally include one or more of the following features.

In a first aspect, the effective mud weight is calculated using the equation: $(MW_{eff})=(MW*CCA)+MW$. In a second aspect, the drilling parameters comprise: a rate of penetration (ROP) of a drilling tool of the drilling system, a hole size of the wellbore, and a flow rate (GPM) of the drilling fluid. In a third aspect, CCA is calculated using the equation $$CCA = \frac{ROP * \text{hole size}^2}{1471 * GPM * TR},$$

wherein TR is a cuttings transport ratio. In a fourth aspect, controlling, based on the effective mud weight, a component of the drilling system to adjust at least one of the drilling parameters comprises: determining, based on the effective mud weight, a rate of penetration for a drilling tool of the drilling system, and controlling the drilling tool such that the rate of penetration of the drilling tool is less than or equal to the determined rate of penetration. In a fifth aspect, determining the rate of penetration for the drilling tool is further based on a pore pressure limit and a fracture pressure limit. In a sixth aspect, the rate of penetration is calculated using the equation:

$$ROP = \frac{810 * (MW_{eff} - MW) * GPM}{(MW * OH^2)},$$

where ROP is the rate of penetration, OH is an open hole size of the wellbore, and GPM is a flow rate of the drilling fluid.

DESCRIPTION OF DRAWINGS

FIGS. 2A, 2B, 3A, 3B, 4A, and 4B are graphs that compare effective mud weight calculated using commercial methods and effective mud weight calculated using the disclosed methods at different wellbore depths, according to some implementations.

Like reference numbers and designations in the various drawings indicate like elements.

DETAILED DESCRIPTION

The following detailed description describes methods and systems for calculating drilling fluid density and using the calculation to improve drilling operations. Various modifications, alterations, and permutations of the disclosed implementations can be made and will be readily apparent to those of ordinary skill in the art. Additionally, the general principles defined may be applied to other implementations and applications without departing from the scope of the disclosure. In some instances, details unnecessary to obtain an understanding of the described subject matter may be omitted so as to not obscure one or more described implementations with unnecessary detail and since such details are within the skill of one of ordinary skill in the art. The present disclosure is not intended to be limited to the described or illustrated implementations but to be accorded the widest scope consistent with the described principles and features.

When using a drilling fluid in a drilling operation, the drilling fluid property that determines the drilling fluid performance is the drilling fluid density (also referred to as mud weight or mud density). The drilling fluid density directly affects many properties of the wellbore, such as wellbore stability, fluid circulation in the wellbore, and formation damage. Accordingly, the drilling fluid density can be used to derive values for wellbore properties. However, during drilling, various factors, such as cuttings from the formation, affect the drilling fuel density. Current drilling fluid density values used in practice are not dynamic values that account for these factors. As a result, models that rely on these drilling fluid densities are inaccurate.

Disclosed are methods and systems for calculating drilling fluid density in real-time during a drilling operation. For example, the term "real-time" can correspond to events that occur within a specified period of time, such as within one minute, within one second, or within milliseconds. The drilling fluid density calculated in real-time is referred to as an effective drilling fluid density. In an implementation, the calculation is based on a cuttings concentration in the annulus (CCA), which is determined using real-time values of drilling parameters. Because the calculation is based on the CCA, the effective drilling fluid density accounts for both the weight of cuttings and the static drilling fluid density. Furthermore, because the effective drilling fluid density is a real-time value, monitoring the effective density allows a drilling system to make decisions whether to adjust corresponding drilling parameters to improve the drilling operation.

Figure 1:
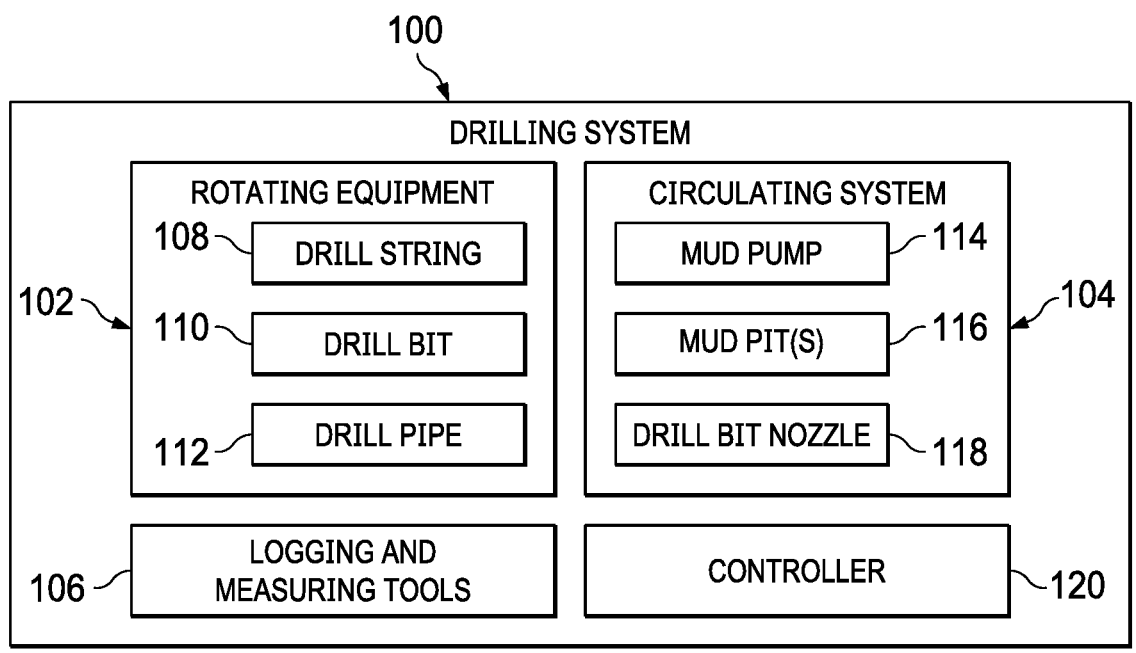
FIG. 1 is a block diagram of an example drilling system, according to some implementations of the present disclosure.

FIG. 1 is a block diagram of an example drilling system 100 for drilling a wellbore, according to some implementations. The drilling system 100 includes rotating equipment 102, circulating system 104, logging and measuring equipment 106, and controller 120. The rotating equipment 102, which is responsible for rotary drilling, includes drill string 108, drill bit 110, and drill pipe 112. The circulating system 104, which is responsible for the circulation of drilling fluid, includes mud pump 114, mud pit(s) 116, and drill bit nozzle 118. The logging and measuring equipment 106 includes sensors, tools, and devices that are configured for measurement while drilling (MWD), logging while drilling (LWD), or both. The controller 120 is a computer system (for example, computer system 600 shown in FIG. 6) that is configured to control one or more components of the drilling system 100.

To drill the wellbore, the drilling system 100 lowers the drill bit 110, which is attached to the drill string 108, into a well until the drill bit 110 makes contact with a formation. Once in contact, the drill bit 110 is rotated to break and fracture the formation, thereby forming the wellbore. As the rotating equipment 102 is drilling the wellbore, the mud pump 114 withdraws drilling fluid from the mud pit(s) 116 and pumps the drilling fluid down the drill string 108 through the drill bit nozzles 118 that are located on the drill bit 110. The drilling fluid flows to the bottom of the wellbore and upward to the surface via an annulus formed between the drilling string 108 and the walls of the wellbore. When flowing to the surface, the drilling fluid carries portions of the formation, called cuttings, that are fractured by the rotating drill bit 110. At the surface, the circulating system 104 filters the cuttings from the drilling fluid and then pumps the drilling fluid back down to the bottom the wellbore.

In an embodiment, during a drilling operation, the drilling system 100 determines, in real-time, the effective drilling fluid density. In an implementation, the drilling fluid density is calculated based on a cuttings concentration in the annulus (CCA), which is calculated using real-time values of drilling parameters. The real-time values of drilling parameters are obtained from logging and measuring tools 106, surface logs, or daily drilling reports. The drilling parameters that are used to calculate the CCA include the rate of penetration (ROP) of the drill bit 110, a hole size of the wellbore, and a flow rate of the mud pump 114. In an example, the CCA is calculated using equation (1):

$$CCA = \frac{ROP * \text{Hole Size}^2}{1471 * GPM * TR}. \tag{1}$$

In equation (1), "Hole Size" is the diameter of the wellbore (in feet), ROP is a rate of penetration (drilling rate, in feet/hour) of a drilling tool (for example, drill bit 110), GPM is the flow rate (in gallon per minutes) of the drilling fluid, and TR represents a transport ratio of the cuttings to the surface. In some examples, TR is approximated as a constant with a value of 0.55.

In an example, the effective drilling fluid density is calculated using equation (2):

$$(MW_{\mathit{eff}}) = (MW * CCA) + MW. \tag{2}$$

In equation (2), $MW_{\mathit{eff}}$ is the effective drilling fluid density (in pounds per gallon (lb/gal)) and MW is the static drilling fluid density (that is, the drilling fluid density without any cuttings). As shown by equation (2), the effective drilling fluid density accounts for the static drilling fluid density and the cuttings concentration.

Once the effective drilling fluid density is calculated, the drilling system 100 can use the density to determine information about the drilling operation. As an example, the drilling system 100 uses the effective drilling fluid density to determine a stability of the formation. In particular, the effective drilling fluid density is indicative of the hydrostatic pressure on the formation, and therefore, the drilling system 100 can use the effective drilling fluid density to derive the stability of the formation. As another example, the effective drilling fluid density is indicative of an extent of cuttings accumulation in the annulus. As yet another example, the effective drilling fluid density is indicative of an amount of fluid of dilution in circulation.

From the derived information about the drilling operation, the drilling system 100 can determine to make one or more adjustments to the operation, perhaps to meet changing downhole conditions. The adjustments may be to surface properties, mechanical parameters (for example, ROP, flow rate, pipe-rotation speed, and tripping speed), or both. In response to making the determination to make one or more adjustments, the drilling system 100 adjusts the operating parameters of one or more components of the drilling system 100 to adjust the surface properties, the mechanical parameters, or both.

In an example, based on the effective drilling fluid density, the drilling system 100 determines a maximum rate of penetration for the drill bit 110. More specifically, the effective drilling fluid density, a pore pressure limit of the formation, and a fracture pressure limit of the formation are used to calculate the stability of the formation. Then, based on the calculated stability, the maximum rate of penetration is calculated. Additionally, the drilling system 100 can control the rate of penetration, perhaps to be less than the calculated maximum rate. Controlling the rate of penetration based on the effective drilling fluid density allows the drilling system 100 to: (i) avoid fracturing the formation while drilling, (ii) ensure smooth drilling with generated drilling cuttings, and (iii) avoid or mitigate stuck pipe incidents.

In an example, the rate of penetration may be calculated using the effective drilling fluid density using equation (3):

$$ROP = \frac{810 * (MW_{eff} - MW) * GPM}{(MW * OH^2)} \quad (3)$$

In equation (3), $MW_{eff}$ is the effective mud weight in pound-force per cubic foot (PCF), MW is the designed mud weight in PCF, GPM is the flow rate of mud pump gallon per minutes, and OH is open-hole size in inches (in).

In another example, based on the effective drilling fluid density, the drilling system 100 adjusts the drilling fluid density. In one implementation, the drilling system 100 adjusts the drilling fluid density by controlling the mud pump 114 to increase or decrease the volume of drilling fluid pumped into the borehole. Increasing the volume of drilling fluid decreases the drilling fluid density by dilution and decreasing the volume of drilling fluid increases the drilling fluid density. In another implementation, the drilling system 100 increases the drilling fluid density by adding a weighing agent to the drilling fluid.

Figure 3B:
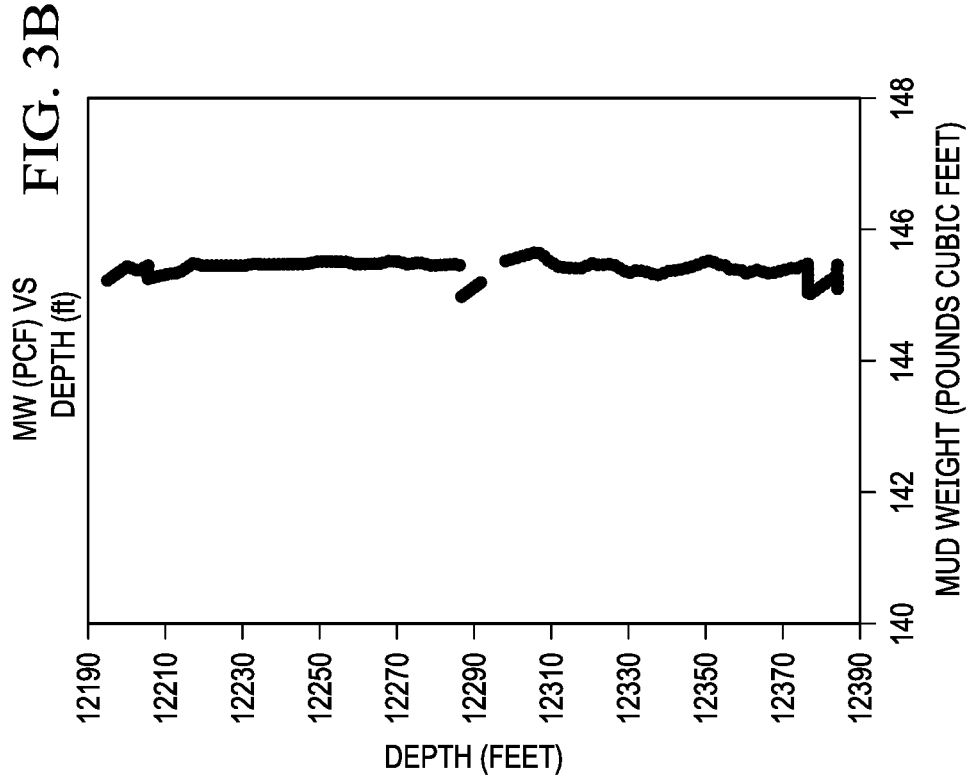
Figure 3A:
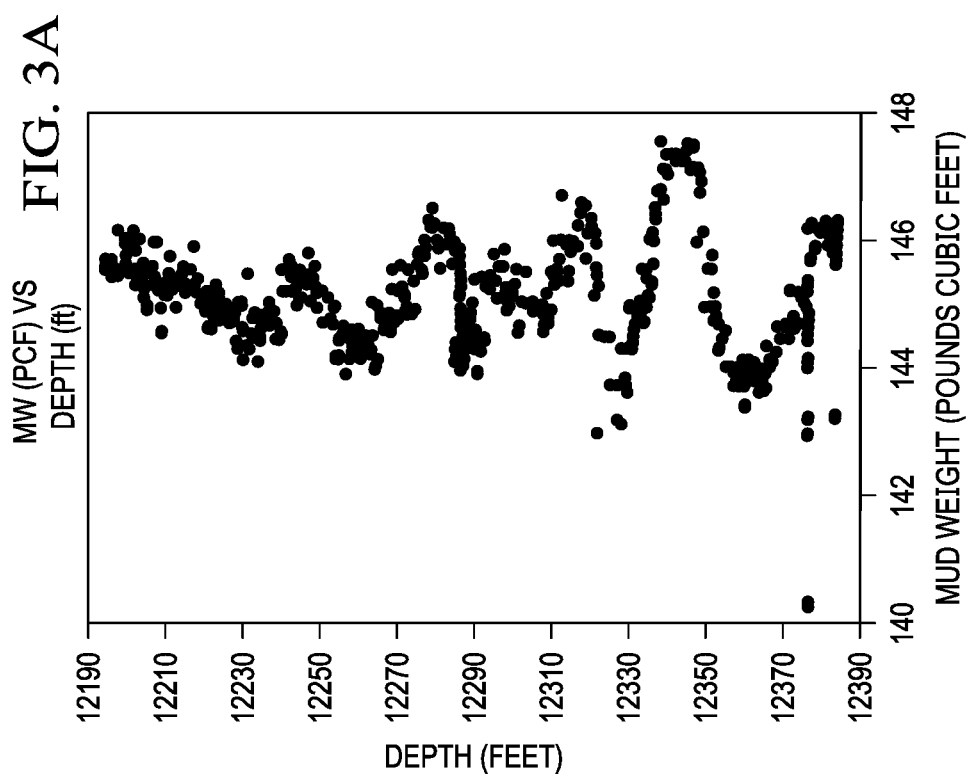
Figure 4B:
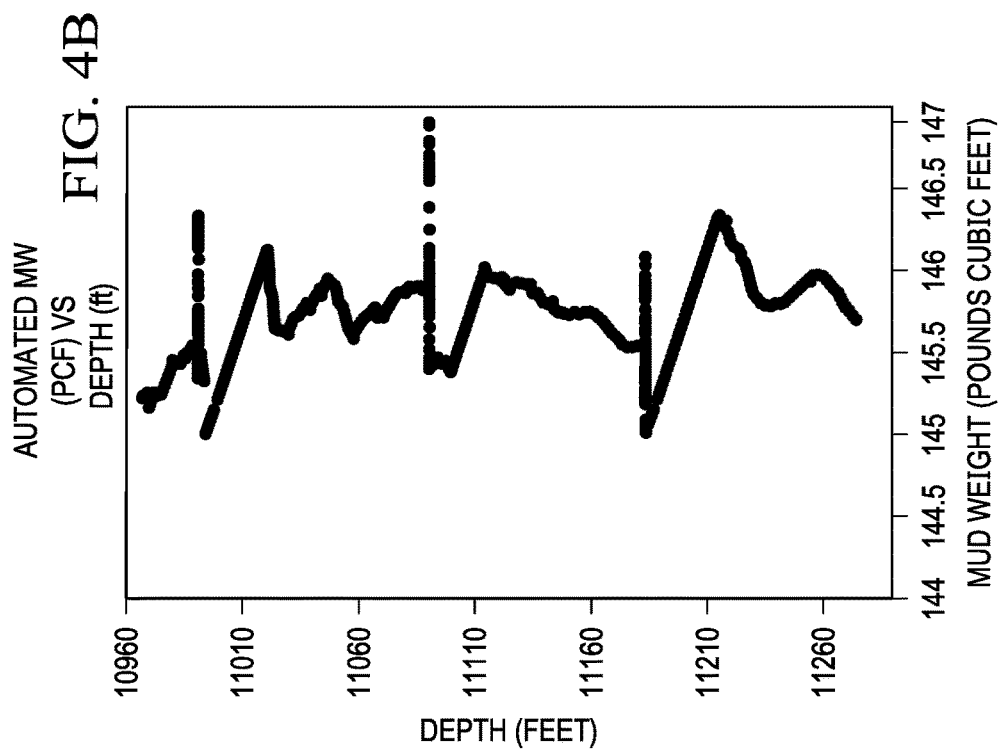
Figure 4A:
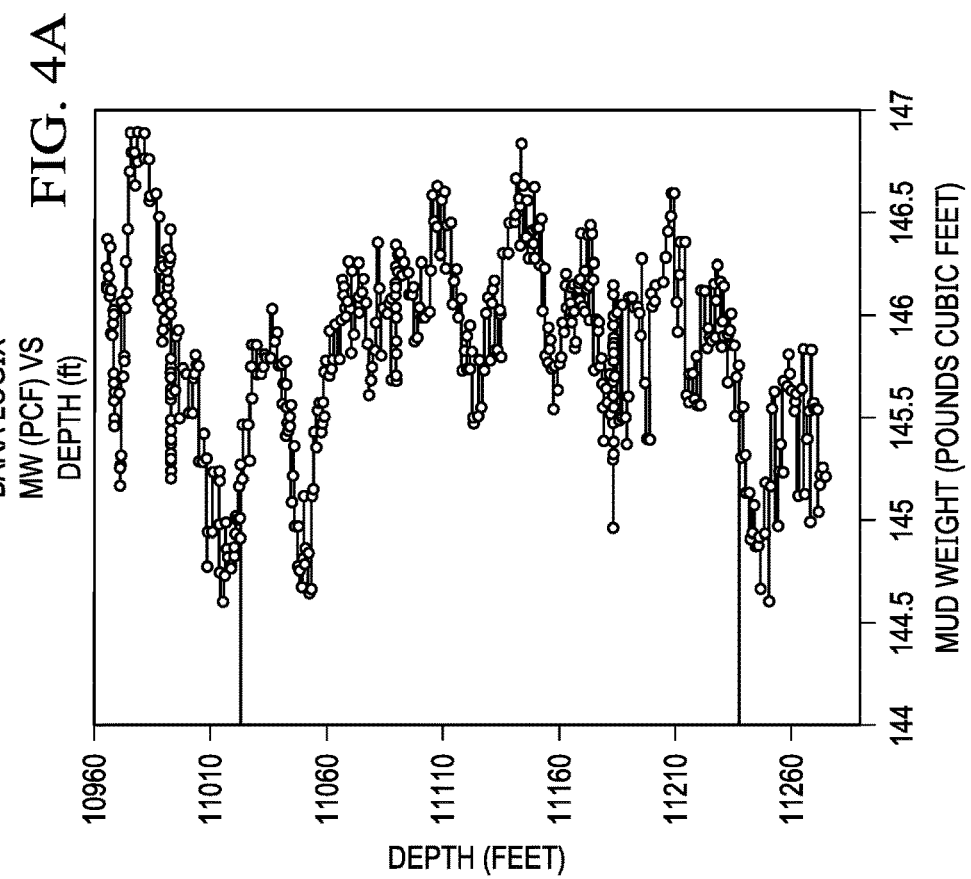

FIGS. 2A, 2B, 3A, 3B, 4A, and 4B are graphs that compare effective mud weight calculated using commercial methods and effective mud weight calculated using the disclosed methods at different wellbore depths, according to some implementations. In particular, the graphs compare the effective mud weight calculated using Baralogix® (commercially available from Halliburton) and the effective mud weight calculated using the disclosed methods. FIGS. 2A, 3A, and 4A illustrate graphs of the effective mud weight, at different depths, calculated using Baralogix®. FIGS. 2B, 3B, and 4B illustrate graphs of the effective mud weight, at different depths, calculated using the disclosed methods. As shown by these figures, the mud weight calculated using the disclosed methods is similar to the mud weight calculated using Baralogix®.

Figure 5:
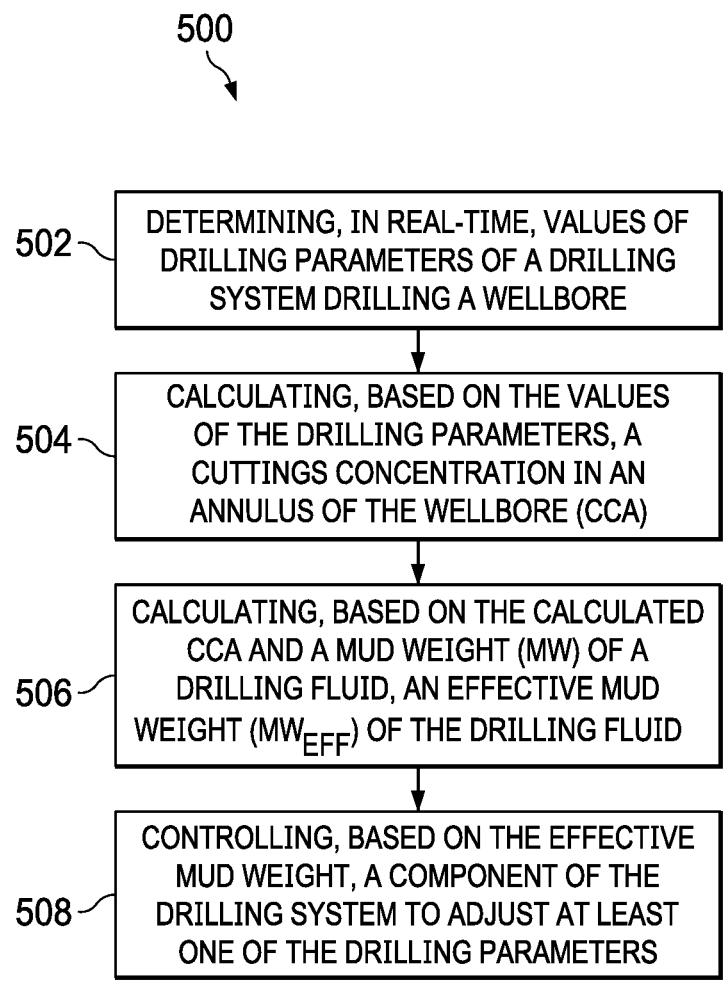
FIG. 5 is a flowchart of an example method for calculating drilling fluid density in real-time, according to some implementations of the present disclosure.

FIG. 5 is a flowchart of an example method 500 for calculating effective drilling fluid density in real-time, according to some implementations. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 600 can be run in parallel, in combination, in loops, or in any order.

Method 500 begins at step 502, which involves determining, in real-time, values of drilling parameters of a drilling system drilling a wellbore. The term real-time can correspond to events that occur within a specified period of time, such as within one minute, within one second, or within milliseconds. In some implementations, some of these variables, such as ROP, hole size, GPM, TR, can be automatically extracted from a received survey log. In some implementations, some of these variables, such as density of the drilling fluid, annular velocity, and rheology factors, can be automatically extracted from a received rheology log. In other implementations, the drilling parameters are determined from one or more additional sources such as measuring while drilling (MWD) tools, logging while drilling (LWD) tools, and daily drilling reports (also referred to as "morning reports").

At step 504, method 500 includes calculating, based on the values of the drilling parameters, a cuttings concentration in an annulus of the wellbore (CCA). In an implementation, the drilling parameters that are used to calculate the CCA include a rate of penetration (ROP) of a drilling tool, a cuttings transport ratio (TR), a hole size of the wellbore, and a mud pump flow rate (GPM). In an example, the CCA is calculated using the equation:

$$CCA = \frac{ROP * \text{Hole Size}^2}{1461 * GPM * TR}.$$

In some examples, TR is estimated as 0.55.

At step 506, method 500 includes calculating, based on the calculated CCA and a mud weight (MW) of a drilling fluid, an effective mud weight ($MW_{eff}$) of the drilling fluid. In an example, the effective drilling fluid density is calculated using the equation: $MW_{eff}=(MW*CCA)+MW$.

At 508, method 500 involves controlling, based on the effective mud weight, a component of the drilling system to adjust at least one of the drilling parameters. In an example, based on the effective drilling fluid density, the drilling system determines a maximum rate of penetration. The rate of penetration may be calculated using the effective drilling fluid density using the equation $$ROP = \frac{810 * (MW_{eff} - MW) * GPM}{(MW * OH^2)}.$$

In another example, based on the effective drilling fluid density, the drilling system adjusts the drilling fluid density.

The example method 500 shown in FIG. 5 can be modified or reconfigured to include additional, fewer, or different steps (not shown in FIG. 5), which can be performed in the order shown or in a different order.

Figure 6:
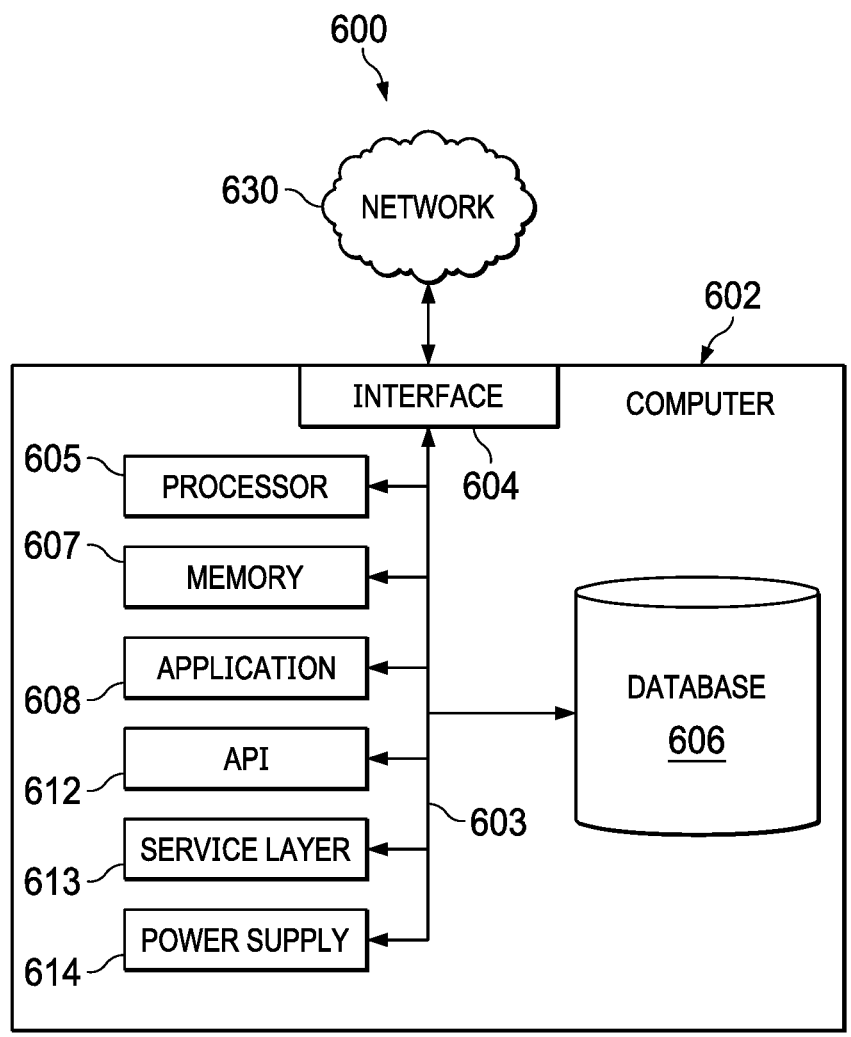
FIG. 6 is a block diagram of an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. In addition, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure.

Moreover, the present disclosure contemplates that many users can use one computer 602 and one user can use multiple computers 602.

Described implementations of the subject matter can include one or more features, alone or in combination.

For example, in a first implementation, a computer-implemented method, comprising: determining, in real-time, values of drilling parameters of a drilling system drilling a wellbore; calculating, based on the values of the drilling parameters, a cuttings concentration in an annulus of the wellbore (CCA); calculating, based on the calculated CCA and a mud weight (MW) of a drilling fluid, an effective mud weight ($MW_{eff}$) of the drilling fluid; and controlling, based on the effective mud weight, a component of the drilling system to adjust at least one of the drilling parameters. The foregoing and other described implementations can each, optionally, include one or more of the following features:

A first feature, combinable with any of the following features, where the effective mud weight is calculated using the equation: ($MW_{eff}$)=(MW*CCA)+MW.

A second feature, combinable with any of the previous or following features, where the drilling parameters comprise: a rate of penetration (ROP) of a drilling tool of the drilling system, a hole size of the wellbore, and a flow rate (GPM) of the drilling fluid.

A third feature, combinable with any of the previous or following features, where the CCA is calculated using the equation:

$$CCA = \frac{ROP * \text{hole size}^2}{1471 * GPM * TR},$$

wherein TR is a cuttings transport ratio.

A fourth feature, combinable with any of the previous or following features, where controlling, based on the effective mud weight, a component of the drilling system to adjust at least one of the drilling parameters includes: determining, based on the effective mud weight, a rate of penetration for a drilling tool of the drilling system; and controlling the drilling tool such that the rate of penetration of the drilling tool is less than or equal to the determined rate of penetration.

A fifth feature, combinable with any of the previous or following features, where determining the rate of penetration for the drilling tool is further based on a pore pressure limit and a fracture pressure limit.

A sixth feature, combinable with any of the previous or following features, where the rate of penetration is calculated using the equation:

$$ROP = \frac{810 * (MW_{eff} - MW) * GPM}{(MW * OH^2)},$$

where ROP is the rate of penetration, OH is an open hole size of the wellbore, and GPM is a flow rate of the drilling fluid.

In a second implementation, a non-transitory, computer-readable medium storing one or more instructions executable by a computer system to perform operations comprising any of the previous steps.

In a third implementation, a computer-implemented system, comprising one or more processors and a non-transitory computer-readable storage medium coupled to the one or more processors and storing programming instructions for execution by the one or more processors, the programming instructions instructing the one or more processors to perform operations comprising any of the previous steps.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   determining, in real-time, values of drilling parameters of a drilling system drilling a wellbore, wherein the drilling parameters comprise: a rate of penetration (ROP) of a drilling tool of the drilling system in feet/hour, a hole size of the wellbore in feet, and a flow rate (GPM) of the drilling fluid at a mud pump of the drilling system in gallon per minutes;
   calculating, based on the values of the drilling parameters, a cuttings concentration in an annulus of the wellbore (CCA), wherein the CCA is calculated using the equation:

$$CCA = \frac{ROP * \text{hole size}^2}{1471 * GPM * TR},$$

and wherein TR is a dimensionless cuttings transport ratio;
   calculating, based on the calculated CCA and a mud weight (MW) of a drilling fluid, an effective mud weight ($MW_{eff}$) of the drilling fluid; and
   controlling, based on the effective mud weight, a component of the drilling system to adjust at least one of the drilling parameters.

2. The computer-implemented method of claim 1, wherein the effective mud weight is calculated using the equation:

$$(MW_{eff}) = (MW * CCA) + MW.$$

3. The computer-implemented method of claim 1, wherein controlling, based on the effective mud weight, a component of the drilling system to adjust at least one of the drilling parameters comprises:
   determining, based on the effective mud weight, a rate of penetration for a drilling tool of the drilling system; and
   controlling the drilling tool such that the rate of penetration of the drilling tool is less than or equal to the determined rate of penetration.

4. The computer-implemented method of claim 3, wherein determining the rate of penetration for the drilling tool is further based on a pore pressure limit and a fracture pressure limit.

5. The computer-implemented method of claim 3, wherein the rate of penetration is calculated using the equation:

$$ROP = \frac{810 * (MW_{eff} - MW) * GPM}{(MW * OH^2)},$$

where OH is an open hole size of the wellbore.

6. A non-transitory, computer-readable medium storing one or more instructions executable by a computer system to perform operations comprising:
   determining, in real-time, values of drilling parameters of a drilling system drilling a wellbore, wherein the drilling parameters comprise: a rate of penetration (ROP) of a drilling tool of the drilling system in feet/hour, a hole size of the wellbore in feet, and a flow rate (GPM) of the drilling fluid at a mud pump of the drilling system in gallon per minutes;
   calculating, based on the values of the drilling parameters, a cuttings concentration in an annulus of the wellbore (CCA), wherein the CCA is calculated using the equation:

$$CCA = \frac{ROP * \text{hole size}^2}{1471 * GPM * TR},$$

and wherein TR is a dimensionless cuttings transport ratio;
   calculating, based on the calculated CCA and a mud weight (MW) of a drilling fluid, an effective mud weight ($MW_{eff}$) of the drilling fluid; and controlling, based on the effective mud weight, a component of the drilling system to adjust at least one of the drilling parameters.

7. The non-transitory, computer-readable medium of claim 6, wherein the effective mud weight is calculated using the equation:

$(MW_{eff})=(MW*CCA)+MW.$

8. The non-transitory, computer-readable medium of claim 6, wherein controlling, based on the effective mud weight, a component of the drilling system to adjust at least one of the drilling parameters comprises:
  determining, based on the effective mud weight, a rate of penetration for a drilling tool of the drilling system; and
  controlling the drilling tool such that the rate of penetration of the drilling tool is less than or equal to the determined rate of penetration.

9. The non-transitory, computer-readable medium of claim 8, wherein determining the rate of penetration for the drilling tool is further based on a pore pressure limit and a fracture pressure limit.

10. The non-transitory, computer-readable medium of claim 8, wherein the rate of penetration is calculated using the equation:

$$ROP = \frac{810*(MW_{eff} - MW)*GPM}{(MW*OH^2)},$$

where OH is an open hole size of the wellbore.

11. A computer-implemented system, comprising:
  one or more processors; and
  a non-transitory computer-readable storage medium coupled to the one or more processors and storing programming instructions for execution by the one or more processors, the programming instructions instructing the one or more processors to perform operations comprising:
    determining, in real-time, values of drilling parameters of a drilling system drilling a wellbore, wherein the drilling parameters comprise: a rate of penetration (ROP) of a drilling tool of the drilling system in feet/hour, a hole size of the wellbore in feet, and a flow rate (GPM) of the drilling fluid at a mud pump of the drilling system in gallon per minutes;
    calculating, based on the values of the drilling parameters, a cuttings concentration in an annulus of the wellbore (CCA), wherein the CCA is calculated using the equation:

$$CCA = \frac{ROP*\text{hole size}^2}{1471*GPM*TR},$$

and wherein TR is a dimensionless cuttings transport ratio;
    calculating, based on the calculated CCA and a mud weight (MW) of a drilling fluid, an effective mud weight ($MW_{eff}$) of the drilling fluid; and
    controlling, based on the effective mud weight, a component of the drilling system to adjust at least one of the drilling parameters.

12. The computer-implemented system of claim 11, wherein the effective mud weight is calculated using the equation:

$(MW_{eff})=(MW*CCA)+MW.$

13. The computer-implemented system of claim 11, wherein controlling, based on the effective mud weight, a component of the drilling system to adjust at least one of the drilling parameters comprises:
  determining, based on the effective mud weight, a rate of penetration for a drilling tool of the drilling system; and
  controlling the drilling tool such that the rate of penetration of the drilling tool is less than or equal to the determined rate of penetration.

14. The computer-implemented system of claim 13, wherein determining the rate of penetration for the drilling tool is further based on a pore pressure limit and a fracture pressure limit.

* * * * *